Sept. 13, 1938.   E. P. CREEHAN   2,129,676
RADIANT ENERGY PROJECTOR
Filed Oct. 6, 1936

INVENTOR
EDWARD P. CREEHAN
BY
*Robert A. Lavender*
ATTORNEY

Patented Sept. 13, 1938

2,129,676

UNITED STATES PATENT OFFICE 2,129,676

RADIANT ENERGY PROJECTOR

Edward P. Creehan, United States Navy

Application October 6, 1936, Serial No. 104,234

2 Claims. (Cl. 240—41.35)

(Granted under the act of March 3, 1883, as amended April 30, 1928; 370 O. G. 757)

My invention relates to a radiant energy projector and more particularly to an improved device of this type for projecting a beam of radiant energy, the rays of which are substantially parallel with respect to each other.

Devices heretofore known and used which purport to effect a parallel beam projection of radiant energy have not been entirely satisfactory for numerous reasons. Either the devices have been too large or too intricate in structure to permit of ease and economy of manufacture, or they have failed to give a beam projection that is sufficiently parallel to be of any marked utility, particularly in those fields of use where directivity is of the essence. Among the unsuccessful attempts to provide a device for effecting a beam projection that is sufficiently parallel to be of any directive value, I am aware that two opposing, confocal, paraboloidal, reflector segments have been employed with the source of radiant energy at the common focal point and the front reflector segment apertured to permit the passage of the radiant energy to be projected. This arrangement has been open to a number of objections in that if a beam of relatively large cross-sectional area is desired it cannot be produced without a substantial number of divergent and unreflected rays that impair the directivity of the device. If, on the other hand, the aperture in the second of the paraboloidal segments is reduced in size such that the unreflected and divergent rays are reduced to a negligible minimum, the projected beam will not be of sufficient size to be of any practical utility.

My invention seeks to obviate the inherent deficiencies of the prior art devices by providing a projector in which at least four reflectors are concatenated or cascaded, the reflectors having reflecting surfaces formed respectively as segments of separate paraboloids having a common axis and a common focal point but different focal lengths. The source of radiant energy is substantially coincident with the common focal point. By virtue of this construction there is formed a solid angle fixed by the common focal point and the opening in the last reflector of the group of reflectors which is of relatively small size. Since any unreflected rays emanating from the source of radiant energy will proceed forwardly of the device and through the solid angle, it will be seen that these divergent rays by reason of the relatively small size of the solid angle will either interfere inappreciably with the directivity of the device or may be conveniently reflected or refracted into the principal beam as parallel rays. The device of my invention possesses the further advantage of being capable of projecting a beam of substantially parallel rays of relatively large cross-sectional area while reducing the divergence of any non-parallel rays to either a desired or negligible minimum.

While in the embodiment of my invention to be described more particularly hereinafter I have shown and described a projector which is adapted for use with light in the visible part of the spectrum I do not desire to be restricted thereto since my projector may be used for projecting all forms of radiant energy such as, for example, heat, sound, and forms of electrical radiation.

It is thus an object of my invention to provide a device for projecting a concentrated beam of radiant energy of substantially constant cross-sectional area, the rays of which are substantially parallel with respect to each other.

It is another object of my invention to provide a device for projecting a concentrated beam of radiant energy, the rays of which are substantially parallel with respect to each other and wherein any accompanying divergent rays are reduced to a negligible minimum so as not to interfere with the directivity of the device while yet insuring the formation of a beam of relatively large cross-sectional area.

It is another and further object of my invention to provide a device for projecting a concentrated beam of radiant energy, the rays of which are substantially parallel with respect to each other and wherein any accompanying divergent rays are reduced to a desirable minimum and either absorbed or caused to take such a direction that they will emerge from the device as parallel rays of the projected beam.

It is another and further object of my invention to provide a device for projecting a concentrated beam of radiant energy, the rays of which are substantially parallel with respect to each other and which has an optimum light gathering ability and is compact and small in size.

It is another and still further object of my invention to provide a device for projecting a concentrated beam of radiant energy, the rays of which are substantially parallel with respect to each other which is simple in structure and which is susceptible of being easily and economically manufactured.

Other objects and many of the attendant advantages of this invention will be readily appreciated as the same becomes better understood by reference to the following detailed description when considered in connection with the accompanying drawing wherein.

Figure 1:
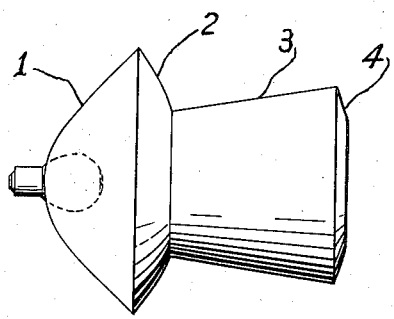
Fig. 1 is a view in side elevation of the device embodying my invention.
Figure 2:
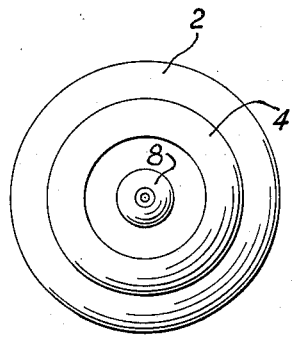
Fig. 2 is a view in end elevation.
Figure 3:
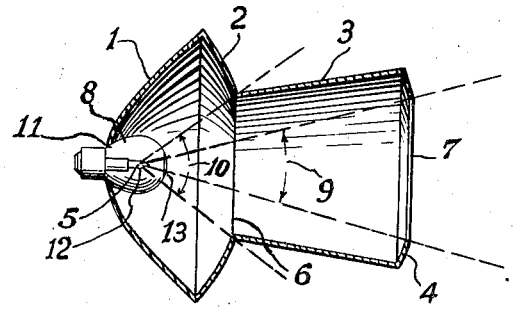
Fig. 3 is a sectional view in elevation of the embodiment of Fig. 1.

Turning now to the drawing, there is shown in Figs. 1 and 3 four reflectors identified by the numerals 1, 2, 3 and 4 whose inner reflecting surfaces are formed respectively as segments of four separate paraboloids having a common axis and a common focal point 5 but different focal lengths. The openings 6 and 7 in the reflectors 2 and 4 respectively for permitting the passage of the radiant energy are equal in size. These openings may be made of any shape desired and may be, for example, circular, rectangular, triangular or of any other convenient configuration. The reflectors may be made in any suitable manner such as from metal, glass, or any other proper material, the inner surfaces of which are made reflecting in character. For projecting light in the visible part of the spectrum, I have found that a silvered inner surface has the requisite reflecting properties. However, any desired material may be employed in fashioning the reflecting surfaces so long as the material will reflect efficiently the particular type of radiant energy in connection with which it is to be used. Suitable filters of any desired filtering characteristics may be removably mounted adjacent the aperture or opening 7.

The advantages attending the cascading of at least four reflecting surfaces as shown in the drawing are apparent. Since the source of radiant energy 8 is substantially coincident with the common focal point 5 there is formed a relatively small solid angle 9 fixed by the common focal point and the opening 7 in the reflector 4. This permits the use of a relatively large opening 7 in the reflector 4 while reducing to either a desirable or negligible minimum any divergent light rays emanating directly from the source of radiant energy through the aforementioned solid angle 9. This result quite evidently cannot be accomplished by the use of the confocal, paraboloidal reflectors 1 and 2 alone. For since the openings 6 and 7 are equal in size it is apparent that a divergent beam of rays 10 projected through the opening 6 will be substantially greater than that encompassed by the solid angle 9. Furthermore, were it desired to produce a projected beam with the paraboloidal reflectors 1 and 2 alone and yet insure that the accompanying divergent rays would fall within the solid angle 9, it would be necessary to reduce the opening 6 to such a size that its diameter would be a section of the solid angle 9. Such an opening would necessarily be of such a size that the projected beam proceeding from the two paraboloidal reflectors 1 and 2 would be of no practical use.

With the openings 6 and 7 having the size shown in Fig. 3 of the drawing, the unreflected light emanating directly from the source of radiant energy 8 and within the solid angle 9 is such as to impair the directivity of the device and hence must be controlled as will be explained more particularly hereinafter. It is evident, however, that by adding more reflectors whose reflecting surfaces are formed as segments of separate paraboloids having axes and focal points common to those of the four reflectors shown in Fig. 3, the solid angle 9 can be made still smaller with attendant reduction of the divergent and unreflected light rays to a negligible minimum so as not to interfere with the directivity of the device. The addition of these reflectors would make it unnecessary to control the small number of divergent and unreflected rays. Alternatively, the divergence of the rays within the solid angle 9 can be reduced to a negligible minimum by slightly decreasing the size of the existing openings 6 and 7.

As a source of radiant energy I have shown in the drawing at 8 an incandescent lamp bulb of any suitable candle power and including an envelope 11 and a concentrated filament 12 which is positioned to be substantially coincident with the common focal point of the cascaded reflectors. Where, as in the embodiment shown in the drawing, it becomes necessary to control the unreflected and divergent rays within the solid angle 9, this can be accomplished either by reflection, refraction or absorption. Where it is desired to reflect the rays which would otherwise proceed through the solid angle 9 I may provide the tip of the envelope 11 with a coating of silver 13 protected by a covering of heat resistant paint. The mirror so formed is spherical in shape with its center of curvature substantially coincident with the common focal point 5 and is only of such extent as to intercept the rays which would otherwise proceed directly without reflection through the solid angle 9. It is evident that any ray of light intercepted by the spherical mirror or reflector 13 on the tip of the bulb will be reflected rearwardly through the common focal point into incidence with the paraboloidal reflector 1, from whence it will be again reflected as a ray of light parallel to those of the projected beam. Instead of forming the spherical mirror as a coating upon the tip of the envelope 11 I may fashion the spherical mirror separately and provide means for detachably associating the mirror so formed with the lamp envelope.

Where it is desired to refract the divergent rays I associate with the lamp envelope a lens of suitable curvature and refractive index such that the divergent rays which are incident thereupon will be refracted into a direction which is substantially parallel to the rays of the projected beam. A further and alternative mode of controlling the divergent rays may be accomplished by absorbing the rays through the medium of a fused cap formed integral with the lamp envelope. Any other expedient known to the prior art, however, may be employed for absorbing the divergent rays.

It is to be observed that any divergent rays emanating from the source of radiant energy 8 and not within the solid angle 9 are intercepted by the various paraboloidal reflectors 1, 2, 3 and 4, and reflected therebetween in a direction parallel to the common reflector axis and through the common focal point, emerging after one or more reflections as rays parallel to each other and to the aforementioned axis. My projector therefore not only insures the projection of a beam of radiant energy, the rays of which are substantially parallel to each other, but also by reason of the openings of equal size in the reflectors for the passage of the radiant energy, insures the projection of a beam of radiant energy of substantially uniform intensity and constant cross-sectional area.

It is apparent that my invention has a wide field of application. It can be advantageously used for signaling where directivity and range are of great importance and in therapeutic work where the desirability of limiting the radiation to certain areas to be treated is at times necessary and expedient. Some of the other possible commercial applications are in the automotive and advertising fields. Numerous other applications will readily suggest themselves to those skilled in the art.

According to the provisions of the patent statutes I have set forth the principle and mode of operation of my invention and have illustrated and described what I now consider to represent its best embodiment. However, I desire to have it understood that within the scope of the appended claims, the invention may be practiced otherwise than as specifically illustrated and described.

The invention herein described and claimed may be used and/or manufactured by or for the Government of the United States of America for governmental purposes without the payment of any royalties thereon or therefor.

I claim:

1. A device for projecting a concentrated beam of substantially parallel rays of radiant energy of relatively large cross-sectional area comprising in combination at least four reflectors of radiant energy, the first of said reflectors having its reflecting surface opposed to that of the second reflector which is provided with an opening for the radiant energy, and the third of said reflectors extending from the opening in the second reflector and having its reflecting surface opposed to that of the fourth reflector which is also provided with an opening for the radiant energy substantially equal in size to that of said second mentioned reflector, the said openings being slightly less in magnitude than the outer rims of said reflectors, said four reflectors being positioned end to end and formed respectively as segments of four paraboloids having a common axis and a common focal point, the extended arrangement of said reflectors being such as to insure the formation of a relatively small solid angle fixed by the common focal point and the opening in the fourth reflector, to limit the divergence of any unreflected rays which might proceed directly from a source of radiant energy at the common focal point through the solid angle to a minimum and to allow the opening in the fourth reflector to be of appreciable size, and a source of radiant energy substantially coincident with the aforementioned common focal point.

2. A device for projecting a concentrated beam of substantially parallel rays of radiant energy of relatively large cross-sectional area comprising in combination an even number of reflectors of radiant energy, not less than four, which are grouped in pairs with the reflecting surfaces of each pair opposed to each other and with each adjacent pair of reflecting surfaces provided with a common opening for the passage of radiant energy which is substantially equal in size to the opening in the last reflector from which the concentrated beam emerges from the device to be projected in the desired direction, the said openings being slightly less in magnitude than the outer rim of the first reflector of the first pair, said reflectors being positioned end to end and formed respectively as segments of separate paraboloids having a common axis and a common focal point, the extended arrangement of said reflectors being such as to insure the formation of a relatively small solid angle fixed by the common focal point and the opening in the last reflector, to limit the divergence of any unreflected rays of radiant energy which proceed directly from a source of radiant energy at the common focal point through the solid angle to a negligible minimum which does not impair the directivity of the device, and a source of radiant energy substantially coincident with the aforementioned common focal point.

EDWARD P. CREEHAN.